(12) United States Patent
Nalawadi et al.

(10) Patent No.: US 7,178,014 B2
(45) Date of Patent: Feb. 13, 2007

(54) METHOD AND APPARATUS FOR USING A MEMORY REGION TO PASS PARAMETERS BETWEEN A RUN TIME ENVIRONMENT AND SMM HANDLER

(75) Inventors: Rajeev K. Nalawadi, Folson, CA (US); Victor M. Munoz, Orangevale, CA (US)

(73) Assignee: Intel Corporation, Santa Clara, CA (US)

(*) Notice: Subject to any disclaimer, the term of this patent is extended or adjusted under 35 U.S.C. 154(b) by 558 days.

(21) Appl. No.: 10/236,570

(22) Filed: Sep. 4, 2002

(65) Prior Publication Data

US 2004/0044888 A1    Mar. 4, 2004

(51) Int. Cl.
*G06F 12/06* (2006.01)
(52) U.S. Cl. .............. 713/1; 713/2; 713/100; 713/300; 711/153; 711/170; 711/173
(58) Field of Classification Search .......... 713/1, 713/2, 100, 300; 711/153, 170, 173
See application file for complete search history.

(56) References Cited

U.S. PATENT DOCUMENTS

| | | | |
|---|---|---|---|
| 6,122,748 A * | 9/2000 | Hobson | 713/323 |
| 6,167,511 A * | 12/2000 | Lewis | 713/2 |
| 6,185,677 B1 * | 2/2001 | Nijhawan | 713/2 |
| 6,446,213 B1 * | 9/2002 | Yamaki | 713/300 |
| 6,457,135 B1 * | 9/2002 | Cooper | 713/323 |
| 6,697,920 B2 * | 2/2004 | Nijhawan et al. | 711/153 |
| 6,715,074 B1 * | 3/2004 | Chaiken | 713/164 |
| 6,895,517 B2 * | 5/2005 | Wang | 713/300 |
| 2003/0084381 A1 * | 5/2003 | Gulick | 714/47 |
| 2003/0097587 A1 * | 5/2003 | Gulick | 713/200 |

* cited by examiner

*Primary Examiner*—A. Elamin
(74) *Attorney, Agent, or Firm*—Sharon Wong

(57) ABSTRACT

An ACPI (Non-Volatile Sleeping) NVS memory region is allocated and defined so that a system BIOS can allocate a placeholder for the different parameters that are passed from the ACPI ASL code to the system management mode (SMM) handler for execution of real mode calls. The different parameters will be updated by runtime ACPI ASL code depending on what needs to be passed to the SMM handler. The SMM handler invokes appropriate calls based on retrieving of different parameters in the ACPI NVS memory region that have been passed from the ACPI ASL code.

15 Claims, 5 Drawing Sheets

METHOD AND APPARATUS FOR USING A MEMORY REGION TO PASS PARAMETERS BETWEEN A RUN TIME ENVIRONMENT AND SMM HANDLER

BACKGROUND

Background Information

When a system such as a computing device is powered on, the boot process begins. The Basic Input Output System (BIOS) code gets control and starts executing the initialization code, once memory is detected and initialized the BIOS code is copied into memory and control is transferred to BIOS code executes from the programmable address map (PAM) region of memory. The BIOS code determines the size of physical memory and builds a memory map based on system components. The BIOS code also copies software and/or other information obtained from various devices which may be part of the computing device or personal computer, such as, for example, the contents of VGA video option ROM, local area network (LAN) card option ROM, small computer system interconnect (SCSI) option ROM, etc. The ROM and BIOS codes are typically stored in the PAM region of memory.

The BIOS code may also include Advanced Configuration and Power Interface (ACPI) software that implements the ACPI specification, including providing an interface by which the operating system may access ACPI tables. It is through this ACPI interface that an operating system may obtain information about and control the characteristics of motherboard devices and other devices coupled to the personal computing device.

The ACPI related system/hardware details may be accessed by the operating system by going through the BIOS provided ACPI tables and also the operating system can interface to the hardware by ACPI Control methods which contain a sequence of steps for communicating with the hardware. The ACPI ASL code that is written by a BIOS developer gets converted into ACPI Machine Language (AML) code by an ASL compiler. AML is the ACPI control method virtual machine language, a machine code for a virtual machine that is supported by an ACPI-compatible operating system. AML is a pseudo-assembly language that is interpreted by an operating system driver. AML is a language processed by an ACPI method interpreter and is primarily a declarative language in that AML provides a set of declarations that are compiled by the ACPI interpreter into the ACPI name space at definition block load time.

The AML resides in the ACPI tables & structures within the system BIOS. A portion of the ACPI software in the BIOS known as ACPI control methods may be written in ACPI Source Language (ASL) as the source language. Original equipment manufacturers (OEMs) and BIOS developers may write control methods in ASL. The ASL code is then translated to AML. ASL and AML are different languages that are closely related. However, the ACPI ASL code cannot execute certain tasks, such as invoking the system BIOS real-mode interrupts and video BIOS real-mode interrupts.

DETAILED DESCRIPTION

In the following description, numerous specific details are set forth such as specific memory configurations, address ranges, protection schemes, etc., in order to provide a more thorough understanding of the present invention. It will be apparent, however, to one skilled in the art, that the present invention may be practiced without these specific details. In other instances, well known apparatus and process steps have not been described in detail in order to avoid obscuring the invention.

An ACPI (Non-Volatile Sleeping) NVS memory region is allocated and defined so that a system BIOS can allocate a placeholder for the different parameters that are passed from the ACPI ASL code to the system management mode (SMM) handler for execution of real mode calls. For example, the operation region offset, length, and bit-length value(s) are defined by the system BIOS during POST. The different parameters will be updated by runtime ACPI ASL code depending on what needs to be passed to the SMM handler. The SMM handler invokes appropriate calls based on retrieving of different parameters in the ACPI NVS memory region that have been passed from the ACPI ASL code.

Figure 1:
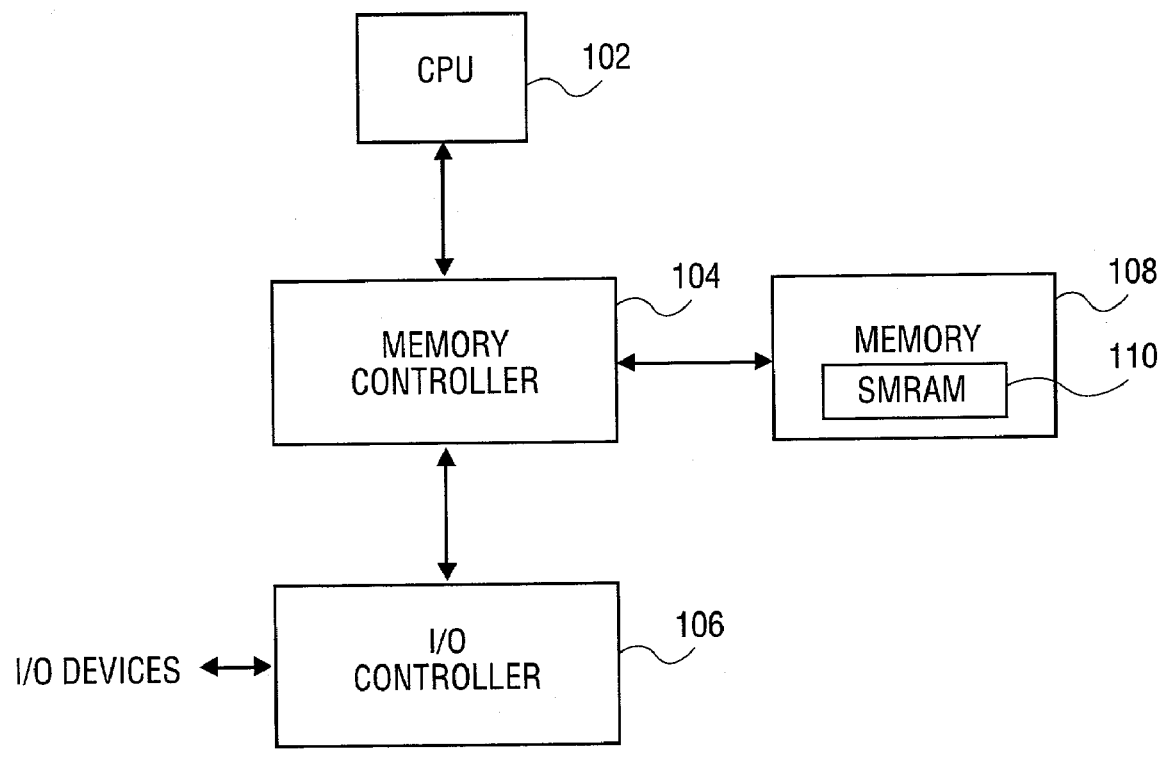
FIG. 1 illustrates a functional block diagram of an embodiment of an exemplary computer system embodying the present invention.

FIG. 1 illustrates an embodiment of an exemplary computer system 100. Embodiments of the present invention can be implemented in any processor-based system which employs any microprocessor that provides the use of a SMM, which is an operating mode that is used to implement power management and other enhanced system functions in firmware in a manner that is transparent to the operating system and applications software. The computer system 100 may be implemented as a desktop computer, a notebook computer or a server.

Figure 3:
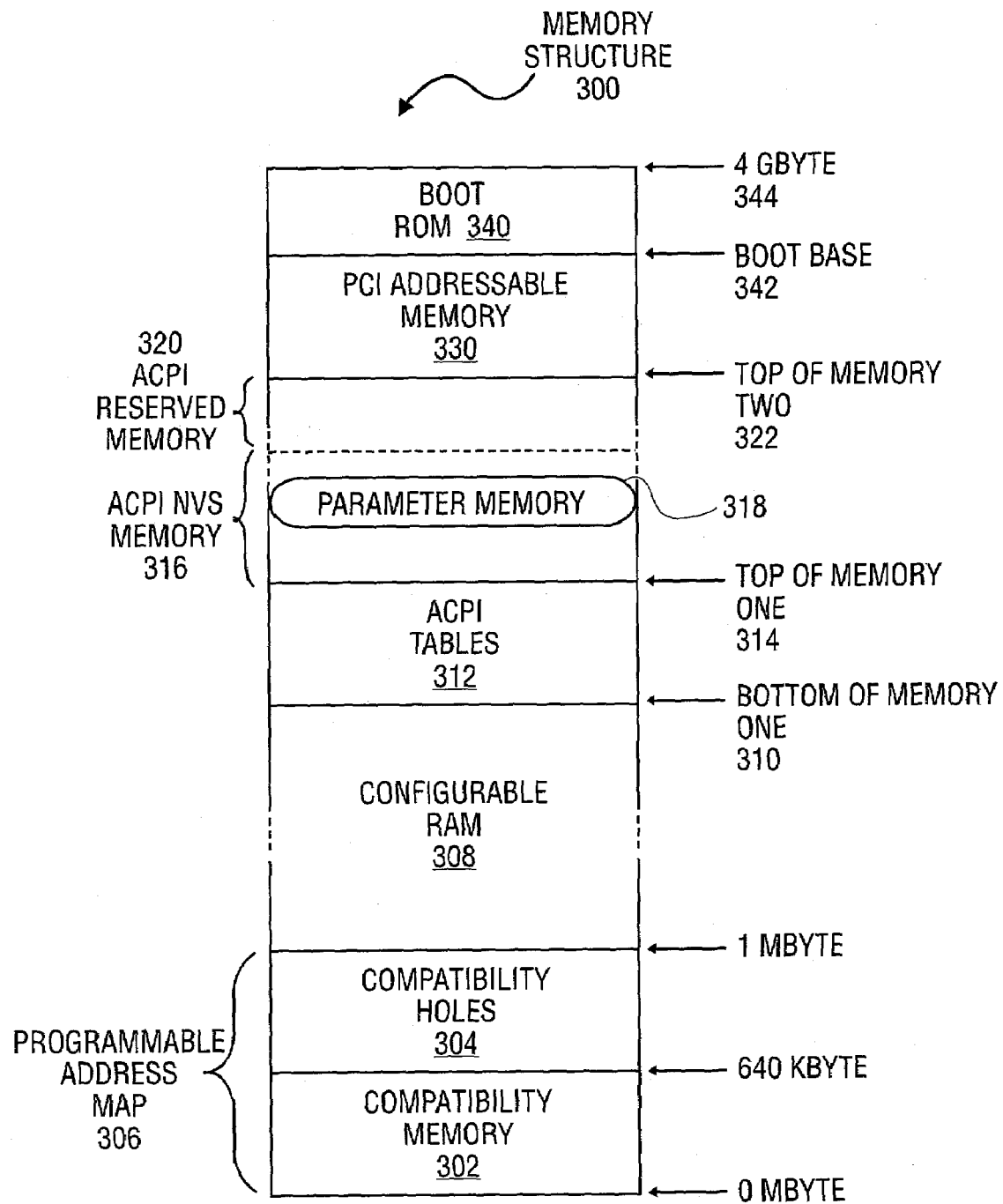
FIG. 3 illustrates a diagram of system memory showing the location of an embodiment of the invention.

Computer system 100 includes processor 102, memory controller 104, input/output (I/O) controller 106 and memory 108. In one embodiment, processor 102 is the Intel P4 microprocessor by Intel Corporation although one skilled in the art will recognize that the present invention may be implemented with other CPUs as well. Processor 102 is coupled to memory controller 104, which is coupled to memory 108 that as illustrated in FIG. 3 includes ACPI NVS memory 316.

Memory controller 104 provides memory address and memory control signals to memory 108 and SMRAM 110 to enable data transfers between memory 108 or SMRAM 110 and processor 102. Processor 102 is also coupled to I/O controller 106, which is in turn coupled to various I/O and peripheral devices. Memory controller 104 and other system logic are typically integrated into a chipset to provide power management BIOS services.

Figure 2:
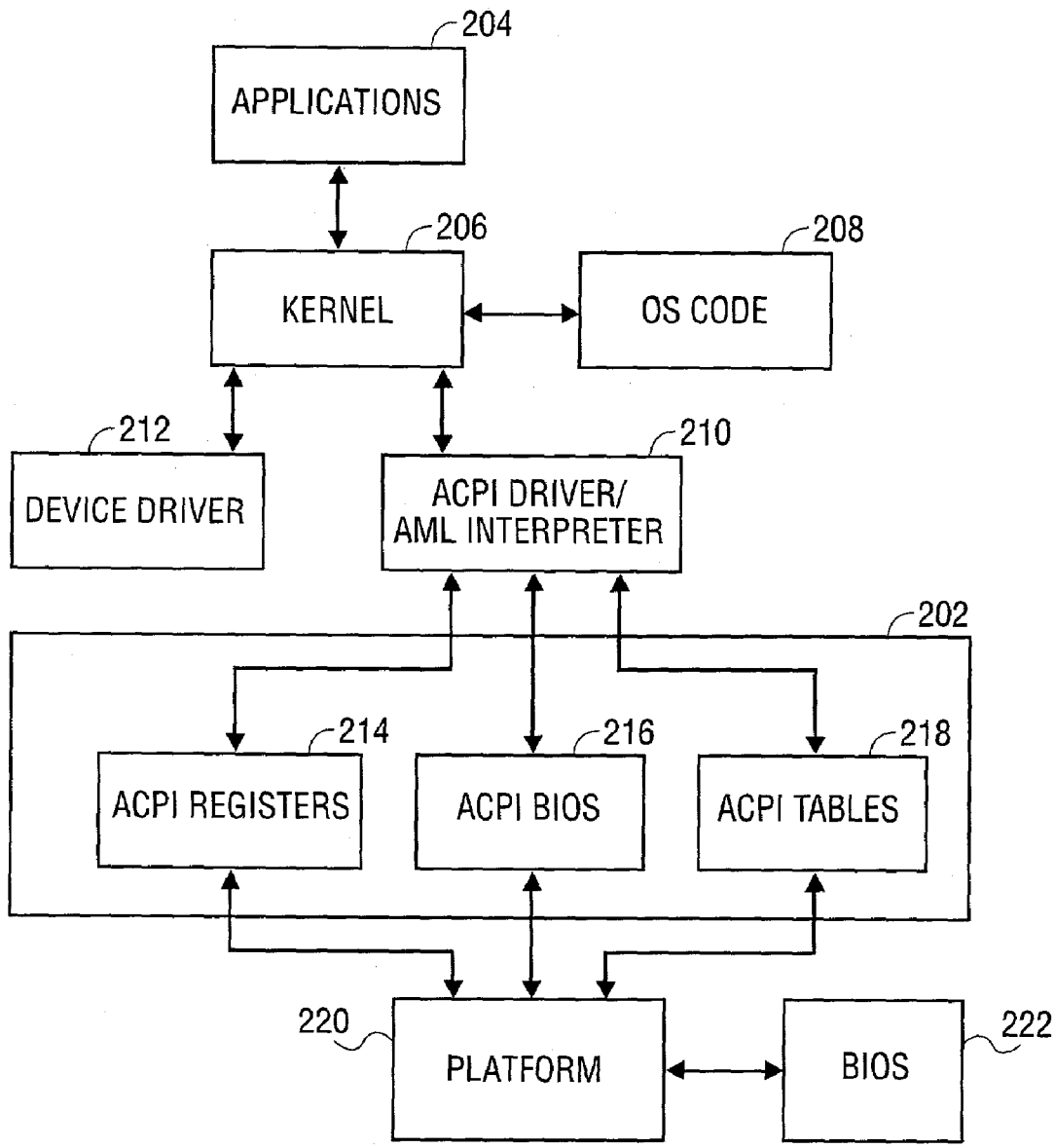
FIG. 2 illustrates a functional block diagram of an embodiment of an exemplary computer system implementing an ACPI system.

FIG. 2 illustrates a functional block diagram of an embodiment 200 of an exemplary computer system implementing an ACPI system 202. AML is a virtual machine language, compiled from ASL, in which device control methods are written, and which is understandable to all ACPI-compatible operating systems. Device control methods are typically written by device manufacturers and provided to platform developers and manufacturers.

Operating system dependent software applications 204 run on a system interface, through kernel 206 with operating system control code 208 and ACPI driver/machine language interpreter 210. Operating system control code 208 and ACPI driver/machine language interpreter 210 operate in software within microprocessor (not shown), and are operating system specific. Kernel 206 also interfaces with device driver 212, also running in software on the microprocessor.

Through ACPI driver/machine language interpreter 210, software interfaces with ACPI registers 214, ACPI BIOS 216, and ACPI tables 218, to platform hardware 220 and, through platform hardware 220, to system BIOS 222. ACPI AML is a machine language capable of interfacing between any ACPI aware operating system and any system Basic Input Output System function. ACPI is intended to interface between hardware and software, though the requirements of the ACPI environment may be viewed in many respects as a hardware specification.

Device driver 212 allows interface with the platform hardware. ACPI tables 218 describe the interface to the hardware. Although some controls are embedded in fixed blocks of registers, ACPI tables 218 specify the addresses of the register blocks. When the operating system executes p-code, ACPI tables 216 can be accessed.

The ACPI specification, which is supported on current computing devices such as personal computers, provides a region in that can be used to store information. According to the system and method described herein, when system memory is mapped according to a specification such as the ACPI specification (rev. 2.0 dated Jul. 27, 2000; see also ACPI Component Architecture Programmer Reference, rev. 1.05 dated Feb. 27, 2001 available from Intel Corporation of Santa Clara, Calif.), a portion of a NVS region of memory may be used by the BIOS 222, in one embodiment, to provide device support during system boot up, and, in another embodiment, through all use of the system.

In accordance with one embodiment of the invention, the SMM parameter support software obtains a portion of the NVS region of memory and uses it to store different parameters that have to be passed from the ACPI ASL code to the SMM handler, such as transfer descriptors.

FIG. 3 illustrates a diagram of system memory showing the location of an embodiment of the invention. In one embodiment, the system memory is mapped according to memory structure 300, as defined in the ACPI specification. Compatibility memory 302 is located in the region of memory located at from 0 to 640 Kbytes. Compatibility holes 304 are located at from 640 Kbyte to 1 Mbyte. In traditional systems, the BIOS is limited to accessing compatibility memory 302 and compatibility holes 304. The compatibility memory 302 and compatibility holes 304 may be referred to as the programmable address map (PAM) region of memory 306. The ACPI specification also defines operating system usable system memory as configurable RAM 308 which is located at from 1 Mbyte to the bottom of memory one 310. In one embodiment, bottom of memory one 310 may be 8 Mbytes. ACPI tables 312 are located in the region from bottom of memory one 310 to an area referred to in the ACPI specification as the top of memory one, denoted 314 in FIG. 3.

The area of memory between the top of memory one and what the ACPI specification refers to as the top of memory two, denoted 322 in FIG. 3, is defined to include two regions of memory, ACPI NVS memory 316 and ACPI reserved memory 320. The ACPI NVS memory region typically holds data that is saved/restored during a resume from one of the ACPI power management suspend states. The ACPI NVS region also is used to hold data that is used to program various devices such as, for example, onboard chipsets, processor(s), PCI devices, AGP devices, Super I/O, etc. when resuming from a suspend state. The ACPI specification also defines a "no memory region" referred to in one embodiment as Peripheral Component Interconnect (PCI) bus addressable memory 330 located between top of memory two and boot base 342. The memory area from boot base 342 to the top of memory 344, at, in one embodiment, 4 Gbytes, is virtually used for boot ROM 340.

In accordance with embodiments of the present invention, a portion of ACPI NVS memory 316 stores different parameters that are passed from the APCI ASL code to the SMM handler. One portion of memory is denoted ACPI NVS parameter memory region 318 within or part of ACPI NVS memory 316. Referring to FIGS. 1 and 3, processor 102 pre-defines the range of addresses within the ACPI NVS memory region 316 that are used to store various parameters for SMM retrieval. An ACPI NVS parameter region 318 is defined and used to pass all the different parameters. In particular, the operation region offset, length and bit-length value(s) are defined by the system BIOS during POST. For example, the parameters can be defined as follows:

Operation Region (CMOS, System Memory, 0xFFFF0000, 0xFFFFC000)

Field (COS, AnyAcc, Lock, Preserve)

{Parameter_1, 32//define parameter #1 with size of 4 bytes

Parameter_2, 32//define parameter #2 with size of 4 bytes

Parameter_3, 16//define parameter #3 with size of 2 bytes

. . .

Parameter_n, xx //define parameter #n with size of n bytes}

Figure 4:
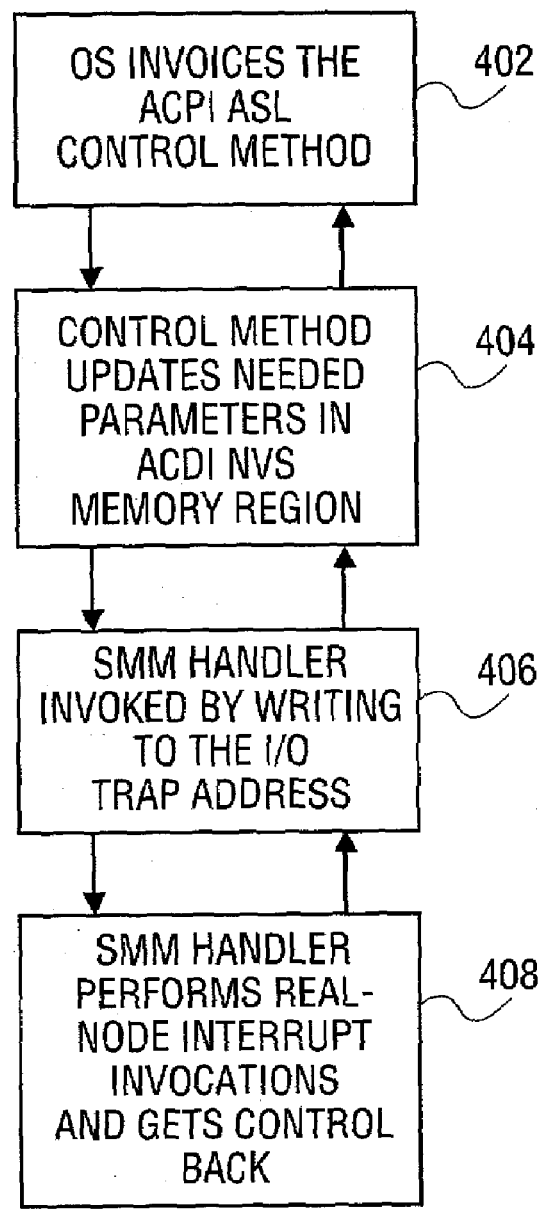
FIG. 4 illustrates a flow diagram of an embodiment of a process for using the ACPI NVS memory region to pass parameters between the runtime environment and SMM handler.

As described below, various parameters are updated by runtime ACPI ASL code depending on what needs to be passed to the SMM handler. Referring to FIG. 4, a flow diagram of an embodiment 400 of a process for using the ACPI NVS memory region to pass parameters between the runtime environment and SMM handler is illustrated. The operating system initially invokes the ACPI ASL control method (step 402).

The ACPI ASL control method updates the needed parameters in the ACPI NVS memory region (step 404). As noted above, an ACPI NVS region is defined and used to pass all the different parameters.

SMM handler is invoked by writing to the I/O trap address generating a real mode interrupt signal to processor 102 (step 406). SMM allows operating system and application software operation to be interrupted to perform certain functions. After performing the function(s), the operating system or application software operation is resumed from the point that it was interrupted. As noted above, the operation region offset, length and bit-length value(s) are defined by the system BIOS during POST. Specifically, a particular I/O address, for example, 1000–100Fh, is used to define an ACPI operating region. Any write to this I/O range address generates an I/O trap SMI. For example, in a typical implementation:

Operation Region (IO_T, SystemIO, 0x1000,0x10)
Field (IO_T,ByteAcc,NoLock,Preserve)
{TRPO, 8}

The invocation of the ACPI ASL control method during runtime execution causes the invocation of SMM handler after the necessary parameters have been placed in the ACPI NVS memory region.

The SMM handler then performs real-mode interrupt invocations (step 408). In particular, in order to initiate certain selected functions, a hardware interrupt, referred to herein as real mode interrupt, is generated. Some typical scenarios that benefit or require the invocation of real-mode interrupts from the ACPI ASL code and hence use of embodiments of the present invention during runtime include, but are not limited to:

Executing low-level platform tasks, for example, workarounds.
Querying processor micro-code path details, including invoking INT15h, D042 calls.
Querying memory map details, including invoking INT15h, e820 calls.
Performing display switching through hot keys, including invoking INT10h calls.
Indicating the presence of particular display outputs (for example, CRT, flat panel and so forth), including querying through ACPI video device extension calls.

Referring to FIGS. 1 and 4, when a real-mode interrupt is received, processor 102 waits for all pending writes to complete. Processor 102 also waits for writes pending on external devices, such as external caches. Once all pending writes are completed, the processor then saves some of its current execution state to memory and begins execution of the SMM handler, a software routine that performs predefined functions. Processor 102, in response, asserts the real mode interrupt control signal that accesses SMRAM 110. SMRAM 110 is a memory space dedicated and secured for use in SMM—i.e. the operating system and applications software do not have access to this space. The necessary parameters are accessed from the ACPI NVS parameter memory region (FIG. 3, 318) and processor 102 jumps to a location in memory to execute the SMM handler code for performing real mode interrupt invocations to perform one or more tasks (step 308). Upon completion of the tasks, the SMM handler executes a resume (RSM) instruction that restores processor's 102 context from SMRAM, de-asserts the real mode interrupt signal, and then returns control to the ACPI ASL control method or previously interrupted operating system or application program execution.

SMM is thus invoked by generating a real-mode interrupt via assertion of the real-mode interrupt signal to processor 102. For example, a real-mode interrupt generation from the SMM handler I/O trap address message forces processor(s) to execute at a default real mode interrupt base address (step 408). The real mode interrupt signal asserts the real mode interrupt and enters the SMM. The real mode interrupt signal informs external devices that the computer system is operating in the SMM mode. Processor 102 then prepares to save the current processor state.

Thus, if there is a need to invoke real-mode interrupts from the ACPI ASL code, the control method updates the needed parameters in the ACPI NVS memory region (step 404) and the SMM handler is invoked by writing to the I/O trap address (step 406). The SMM handler executes the real-mode calls (step 406). After the real-mode calls are completed, control is transferred back to the ACPI ASL (steps 406–402). The call from the ACPI ASL control method to the SMM handler code switches processor 102 from ACPI ASL control code to the SMM handler performing real-mode interrupts. Control is transferred back to the ACPI ASL control code.

Figure 5:
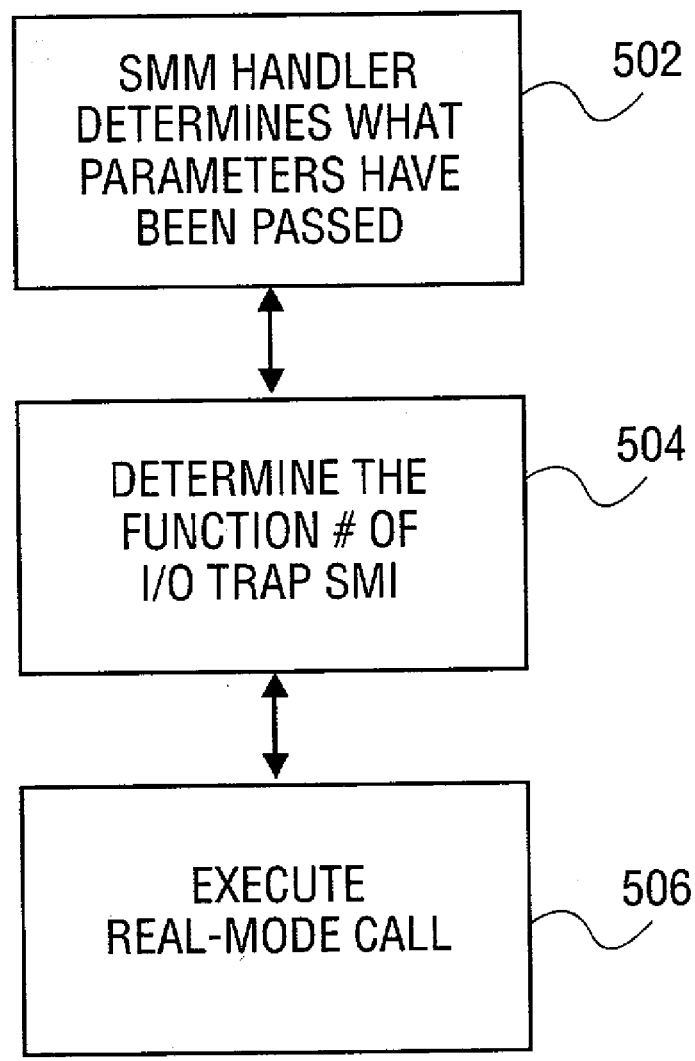
FIG. 5 illustrates a flow diagram of an embodiment of a process for using the SMM handler to invoke appropriate calls based on retrieving of different parameters in the ACPI NVS memory region that have been passed from the ACPI ASL code.

Referring to FIG. 5, a detailed flow diagram of an embodiment 500 of a process for using the SMM handler to invoke real mode calls based on retrieving of different parameters in the ACPI NVS memory region that have been passed from the ACPI ASL code is illustrated. In order to switch to the SMM handler to execute real mode calls, the SMM handler invoked writes to the I/O trap address.

In step 502, the SMM handler determines what parameters have been passed. This is dependant upon which different tasks can be invoked from within the SMM handler.

In step 504, the function number of the I/O trap SMI is determined and the corresponding real mode call is invoked. For example, in a typical implementation:

```
mov         al, BYTE PTR es:[esi+Parameter_1]
cmp         al, 0
je          Function_0 ; Called by _xxx ACPI ASL Control Method
cmp         al, 1
je          Function_1 ; Called by _yyy ACPI ASL Control Method
cmp         al, n
je          Function_1 ; Called by _zzz ACPI ASL Control Method
Function_0:
; ; Invoke Real-Mode call #1
; ; Include the call here
jmp AcpiNvs_SMMDone
Function_1:
; ; Invoke Real-Mode call #2
; ; Include the call here
jmp AcpiNvs_SMMDone
............
............
Function_n:
; ; Invoke Real-Mode call #3
; ; Include the call here
jmp AcpiNvs_SMMDone
```

In step 506, the SMM handler executes the real-mode calls. The SMI handler then begins to perform the task required to process the system management activities. The processor 102 forms the real mode addresses and runs the application program that is the real task. Flags are preserved and the processor 102 is subsequently returned to the ACPI ASL control code after all the real mode calls have been completed.

After the real-mode calls are completed, control is transferred back to the ACPI ASL. The call from the ACPI ASL control method to the SMM handler code switches processor from ACPI ASL control code to the SMM handler performing real-mode interrupts. Control is transferred back to the ACPI ASL control code.

Having now described the invention in accordance with the requirements of the patent statutes, those skilled in the art will understand how to make changes and modifications to the present invention to meet their specific requirements or conditions. Such changes and modifications may be made without departing from the scope and spirit of the invention as set forth in the following claims.

What is claimed is:

1. A computer system comprising:
a memory coupled to a bus, the memory mapped according to a predetermined specification;
a device controller coupled to the bus; and a basic input-output system (BIOS) coupled to the bus, the BIOS having a device support component to provide support for a device using a portion of a defined region of the memory to maintain and pass parameters when a SMM handler is invoked from an ACPI ASL code.

2. The system of claim 1, wherein:
the predetermined specification is the Advanced Configuration and Power Interlace (ACPI) specification; and
the defined region is the non-volatile sleeping (NVS) region defined by the ACPI specification.

3. The system of claim 2, wherein the parameters are updated by ACPI ASL code in response to the calls invoked by the SMM handler.

4. The system of claim 2, wherein the defined region is defined by an operation region offset, length and bit-length values.

5. A system comprising:
a memory coupled to a bus;
a device controller coupled to the bus;
a basic input-output system (BIOS) coupled to the bus, the BIOS having instructions which when executed cause the processor to perform operations including:
mapping the memory pursuant to a predetermined specification to include a defined region of the memory;
allocating a portion of the defined region of the memory to be used to maintain and pass parameters when a SMM handler is invoked from an ACPI ASL code.

6. The system of claim 5, wherein:
the predetermined specification is the Advanced Configuration and Power Interface (ACPI) specification; and
the defined region is the non-volatile sleeping (NVS) region defined by the ACPI specification and used for passing parameters to other components of the software.

7. The system of claim 6, wherein the parameters are updated by ACPI ASL code in response to the calls invoked by the SMM handler.

8. The system of claim 6, wherein allocating a portion of the defined region of the memory to be used to maintain and pass parameters when a SMM handler is invoked from the ACPI ASL code includes:
defining the region by operation region offset, length and bit-length values.

9. A method for using an ACPI NVS memory region to pass parameters between a runtime environment and SMM handler, comprising:
configuring the ACPI NVS memory region to include a parameter region to maintain and pass parameters when a SMM handler is invoked from an ACPI ASL control mode;
updating parameters in the ACPI NVS memory region;
invoking a SMM handler mode;
performing real-mode calls while operating in the SMM handler mode; and
returning control to the ACPI ASL control mode after the real mode calls are performed.

10. The method of claim 9, wherein invoking a SMM handler mode further comprises:
writing to a predefined I/O trap address.

11. The method of claim 10, wherein invoking a SMM handler mode further comprises:
determine what parameters have been passed depending on which different tasks can be invoked from the SMM handler; and
determine the function number associated with the I/O trap address.

12. A machine readable storage medium having stored therein a plurality of machine readable instructions executable by a processor to use an ACPI NVS memory region to pass parameters between a runtime environment and SMM handler, comprising:
instructions to configure the ACPI NVS memory region to include a parameter region to maintain and pass parameters when a SMM handler is invoked from an ACPI ASL control mode;
instructions to update parameters in the ACPI NVS memory region;
instructions to invoke a SMM handler mode;
instructions to perform real-mode calls while operating in the SMM handler mode; and
instructions to return control to the ACPI ASL control mode after the real mode calls are performed.

13. The machine readable medium of claim 12, wherein instructions to invoke a SMM handler mode further comprises:
instructions to write to a predefined I/O trap address.

14. The machine readable medium of claim 12, wherein instructions to invoke a SMM handler mode further comprises:
instructions to determine what parameters have been passed depending on which different tasks can be invoked from the SMM handler; and
instructions to determine the function number associated with the I/O trap address.

15. The machine readable medium of claim 12, further comprising:
instructions to limit access to a portion of the ACPI NVS memory region.

* * * * *